(12) United States Patent
Inoue et al.

(10) Patent No.: US 11,948,319 B2
(45) Date of Patent: Apr. 2, 2024

(54) STRUCTURE DETECTION APPARATUS, STRUCTURE DETECTION METHOD, AND STRUCTURE DETECTION PROCESSING PROGRAM

(71) Applicant: NIPPON TELEGRAPH AND TELEPHONE CORPORATION, Tokyo (JP)

(72) Inventors: Masaaki Inoue, Musashino (JP); Tomoya Shimizu, Musashino (JP); Ryuji Honda, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 270 days.

(21) Appl. No.: 17/437,887

(22) PCT Filed: Mar. 18, 2020

(86) PCT No.: PCT/JP2020/011895
§ 371 (c)(1),
(2) Date: Sep. 10, 2021

(87) PCT Pub. No.: WO2020/189703
PCT Pub. Date: Sep. 24, 2020

(65) Prior Publication Data
US 2022/0172389 A1 Jun. 2, 2022

(30) Foreign Application Priority Data
Mar. 18, 2019 (JP) ................................ 2019-049762

(51) Int. Cl.
*G06T 7/593* (2017.01)
*G01C 3/06* (2006.01)
(Continued)

(52) U.S. Cl.
CPC .............. *G06T 7/593* (2017.01); *G01C 3/06* (2013.01); *G01S 17/89* (2013.01); *G06T 7/521* (2017.01); *G06T 15/00* (2013.01); *G06T 17/00* (2013.01)

(58) Field of Classification Search
CPC ......... G06T 7/593; G06T 7/521; G06T 15/00; G06T 17/00; G01C 3/06; G01C 15/002;
(Continued)

(56) References Cited

U.S. PATENT DOCUMENTS

2003/0034971 A1   2/2003  Fujiwara et al.
2021/0142551 A1*  5/2021  Kobayashi .............. G06T 15/04

FOREIGN PATENT DOCUMENTS

JP   H04155211 A      5/1992
JP   200358911 A      2/2003
JP   2018156408 A    10/2018

OTHER PUBLICATIONS

Toshiya Ohira et al., Consideration about the method for correcting distortion of 3D pole model, 2018 IEICE Communication Society Conference, Sep. 11, 2018, p. 242.

* cited by examiner

*Primary Examiner* — Farzana Hossain
(74) *Attorney, Agent, or Firm* — Harness, Dickey & Pierce, P.L.C.

(57) ABSTRACT

A structure detection device according to an embodiment includes: a reading processing unit that reads, as three-dimensional point group data on an object present in a three-dimensional space, data including three-dimensional position information and color information at a point on a surface of the object; a filtering processing unit that performs filtering processing for extracting three-dimensional point group data on a detection-target structure from the three-dimensional point group data on the object present in
(Continued)

the three-dimensional space based on the color information; and a generation processing unit that generates three-dimensional model data in which the detection-target structure is represented as a three-dimensional model based on the three-dimensional point group data on the detection-target structure, the three-dimensional point group data being extracted by the filtering processing unit.

8 Claims, 8 Drawing Sheets

(51) Int. Cl.
    *G01S 17/89*     (2020.01)
    *G06T 7/521*     (2017.01)
    *G06T 15/00*     (2011.01)
    *G06T 17/00*     (2006.01)

(58) Field of Classification Search
    CPC ...... G01S 17/89; G01S 7/4802; G01S 7/4808; G01S 17/42; G01S 17/86
    See application file for complete search history.

STRUCTURE DETECTION APPARATUS, STRUCTURE DETECTION METHOD, AND STRUCTURE DETECTION PROCESSING PROGRAM

CROSS-REFERENCE TO RELATED APPLICATIONS

This application is a 371 U.S. National Phase of International Application No. PCT/JP2020/011895 filed on Mar. 18, 2020, which claims priority to Japanese Application No. 2019-049762 filed on Mar. 18, 2019. The entire disclosures of the above applications are incorporated herein by reference.

TECHNICAL FIELD

An embodiment of the present invention relates to a structure detection device, a structure detection method, and a structure detection processing program.

BACKGROUND ART

Heretofore, to grasp the condition of communication facilities such as a pole and a cable, a maintenance worker is dispatched to the site and checks every communication facility visually to determine whether it is healthy or not.

In recent years, deflection vector detection (hereinafter referred to as related art) using an inspection vehicle has been known as means for determining whether the facilities are healthy or not in a two-dimensional manner to efficiently perform an operation related to checking (e.g., see Non-Patent Literature 1).

In the related art, an inspection vehicle including a three-dimensional laser scanner (3D laser survey instrument), a camera, a GPS (Global Positioning System) receiver, an IMU (Inertial Measurement Unit), and odometer travels in a city while performing three-dimensional laser scanning and image capturing.

This vehicle performs three-dimensional surveying on a structure or natural object including the communication facilities in a two-dimensional manner, and collects point group data including XYZ-coordinates and an intensity of reflected light. The intensity of reflected light is also referred to as a reflection intensity.

Three-dimensional model data on the structure and natural object is created based on the point group data, and a deflection vector for the above-described communication facilities is calculated based on the lowest point of a central axis in the three-dimensional model data and several points of any locations.

Further, in the city, there are areas, such as a vehicle-free area and an unpaved street, in which the accuracy of coordinates of point group data are not sufficient depending on the road width. In the areas, the maintenance worker carries the above-described three-dimensional laser scanner, and the three-dimensional laser scanner is fixed with a tripod or the like so that three-dimensional surveying is performed to obtain point group data and calculate a deflection vector for the communication facilities based on an analysis result of the above-described three-dimensional model data.

CITATION LIST

Non-Patent Literature

Non-Patent Literature 1: Toshiya Ohira, Takashi Goto, Masaki Waki, Shigehiro Matsuda, and Yoshiyuki Kajiwara, "Consideration about the method for correcting distortion of 3D pole model acquired by MMS", 2018 Society Conference of The Institute of Electronics, Information and Communication Engineers, B-13-23, 2018.

SUMMARY OF THE INVENTION

Technical Problem

However, the related art has the following problem. That is, high-density point group data is required to detect the deflection vector with high accuracy in the above description. There is only a limited number of calculation devices have a processing capability for processing the point group data, obtaining a three-dimensional model, and analyzing the model.

In addition, a vast number of storage devices for storing data are required. To solve the above-described limitations, not only an improvement in the performance of the calculation device, but also an overhaul of a calculation algorithm is required.

The present invention has been made in view of the above-described circumstances, and an object of the invention is to provide a structure detection device, a structure detection method, and a structure detection processing program, which enable detection of a structure present in a three-dimensional space while reducing a processing load.

Means for Solving the Problem

To attain the above-described object, a first aspect of a structure detection device according to an embodiment of the present invention includes: a reading processing unit that reads, as three-dimensional point group data on an object present in a three-dimensional space, data including three-dimensional position information and color information at a point on a surface of the object; a filtering processing unit that performs filtering processing for extracting three-dimensional point group data on a detection-target structure from the three-dimensional point group data on the object present in the three-dimensional space based on the color information; and a generation processing unit that generates three-dimensional model data in which the detection-target structure is represented as a three-dimensional model based on the three-dimensional point group data on the detection-target structure, the three-dimensional point group data being extracted by the filtering processing unit.

Effects of the Invention

According to an aspect of the present invention, it is possible to detect a structure present in a three-dimensional space while reducing a processing load.

DESCRIPTION OF EMBODIMENTS

An embodiment of the present invention will be described below with reference to the drawings.

Figure 1:
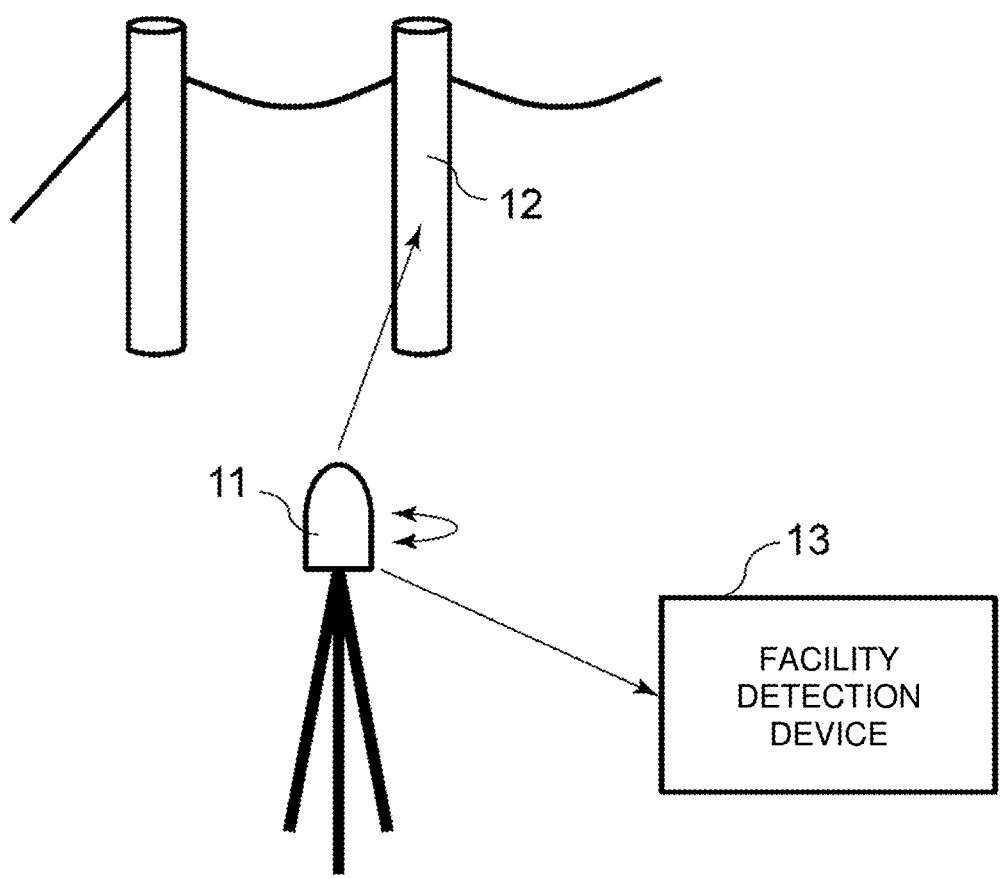
FIG. 1 is a diagram illustrating an example of a method for acquiring point group data on a detection-target facility by a facility detection device according to an embodiment of the present invention.

FIG. 1 is a diagram illustrating an example of a method for acquiring point group data on a detection-target facility by a facility detection device according to an embodiment of the present invention. A method for acquiring point group data on the detection-target facility by using a three-dimensional laser survey instrument will now be described.

FIG. 1 illustrates a fixed 3D laser scanner 11 serving as a three-dimensional laser survey instrument, a detection-target facility 12, and a facility detection device 13 serving as a structure detection device. In this case, the detection-target facility 12 is a columnar object.

The fixed 3D laser scanner 11 is installed on a fixed base, such as a tripod fixed on the ground.

The fixed 3D laser scanner 11 emits laser light to be rotated in each of a horizontal direction and a vertical direction with respect to the ground within an angle range of 0° to 360°. The fixed 3D laser scanner 11 acquires an X-coordinate, a Y-coordinate, and a Z-coordinate, as three-dimensional coordinates at a point on a surface of the detection-target facility 12 based on laser reflected light from a natural object including the detection-target facility 12.

Further, the fixed 3D laser scanner 11 measures light intensity of the reflected light. Like in the emission of laser to be rotated, the fixed 3D laser scanner 11 acquires an optical image in all directions by a built-in camera, extracts color information from the optical image, and applies RGB values to the acquired three-dimensional coordinates described above.

Accordingly, the use of the fixed 3D laser scanner 11 makes it possible to acquire, as appearance image data on a natural object, three-dimensional point group data (hereinafter also referred to as point group data) including three-dimensional coordinates, light intensity, and RGB values at a point on a surface of the natural object including the detection-target facility 12. The fixed 3D laser scanner 11 sends the acquired point group data to the facility detection device 13, and the facility detection device 13 is caused to analyze the data.

Figure 2:
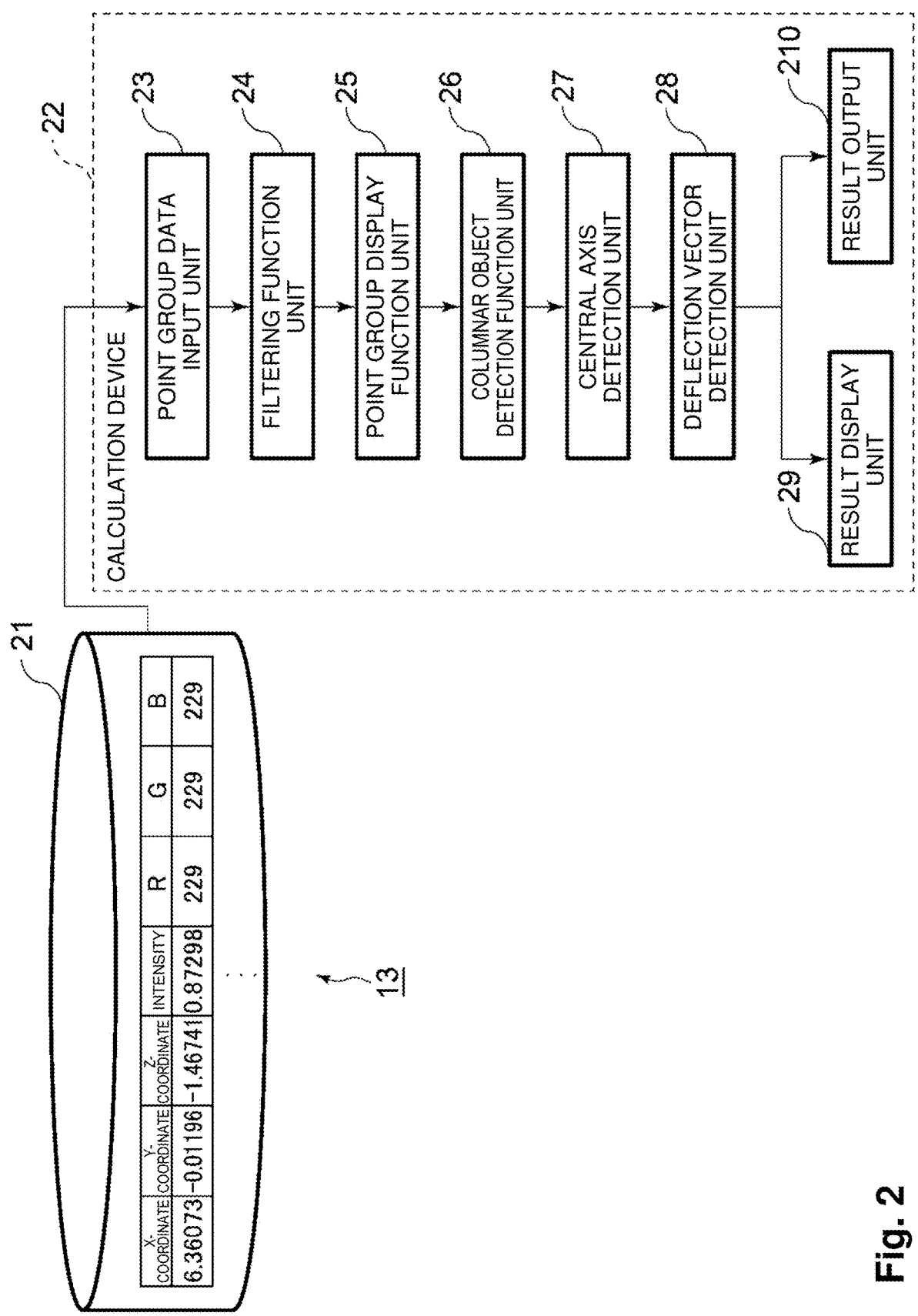
FIG. 2 is a diagram illustrating an example of a configuration of the facility detection device according to an embodiment of the present invention.

FIG. 2 is a diagram illustrating an example of a configuration of a facility detection device according to an embodiment of the present invention.

The facility detection device 13 includes a storage device 21 and a calculation device 22. The calculation device 22 may be made up of a computer including a central processing unit (CPU), a program memory, and a memory for calculation.

As functions necessary for carrying out this embodiment, the facility detection device 13 includes a point group data input unit 23, a filtering function unit 24, a point group display function unit 25, a columnar object detection function unit 26, a central axis detection unit 27, a deflection vector detection unit 28, result display unit 29, and a result output unit 210.

Each unit in the calculation device 22 can be implemented by causing the above-described CPU to execute a program stored in a program memory. Note that the calculation device 22 can be configured using hardware, but instead can be implemented by a combination of the storage device 21 and a known computer in which a program including a procedure illustrated in a flow chart to be described below is installed via a medium or a communication line, the above-described computer including the storage device 21, or the like.

Note that the storage device 21 may be provided in a cloud server, a local server, or the like other than the facility detection device 13. In this case, the facility detection device 13 acquires data stored in the storage device 21 using a communication unit via a communication network from the storage device 21 of the cloud server or the local server.

The point group data sent from the fixed 3D laser scanner 11 as described above is stored in the storage device 21 such as an SSD (Solid State Drive) or an HDD (Hard Disk Drive). The point group data is a ptx format file. This data includes point group data on one or more detection-target facilities 12. The point group data is imported into the calculation device 22 by the point group data input unit 23.

The point group data input unit 23 preliminarily designates a distance between the fixed 3D laser scanner 11 and the detection-target facility 12, and reads only the point group data present in a sphere with a radius corresponding to the distance.

Further, the point group data input unit 23 designates a thinning ratio for reading of point group data, thereby making it possible to change the amount of point group data to be read.

For example, in a case where point group data has a score of 10,000 points, when thinning of 10% is designated, the point group data input unit 23 reads the point group data having the score of 10,000 points described above by thinning points at regular intervals, thereby reading point group data having a score of 9,000 points. The point group data read by the point group data input unit 23 is delivered to the filtering function unit 24.

The filtering function unit 24 extracts a point group for the above-described detection-target facility based on RGB values held in the point group data, or frequency information calculated based on RGB values in the three-dimensional space, or based on both of the RGB values and the frequency information.

Further, the filtering function unit 24 removes, by filtering, point group data indicating any natural object, such as a tree, from the point group data delivered from the point group data input unit 23. The filtered point group data is delivered to the point group display function unit 25.

The point group display function unit 25 performs three-dimensional display of point group data on a screen of a display device, which is not illustrated, based on three-dimensional coordinates held in the filtered point group data. The displayed point group data is colored based on the RGB values associated with the three-dimensional coordinates. Further, the point group display function unit 25 can also display the above-described point group data with gradation depending the level of the reflection intensity.

The point group display function unit 25 can perform rotation and zoom-in/zoom-out of point group data displayed on the screen and can switch display/non-display of any selected area. The point group data that is confirmed to be displayed is delivered to the columnar object detection function unit 26.

Note that if there is no need for a maintenance worker to perform a confirmation operation when point group data is displayed, the point group display function unit 25 can be omitted.

The columnar object detection function unit 26 creates three-dimensional model data on a columnar object in which a detection-target model is represented as a three-dimensional model based on the point group data on the detection-target facility obtained by filtering. An example where the columnar object is a power pole will now be described.

The columnar object detection function unit 26 extracts circle information from the three-dimensional coordinates of the point group data on the detection-target facility, and connects circular models in a longitudinal direction, thereby creating three-dimensional data in which the power pole is represented as a three-dimensional model. This model data is also referred to simply as a power pole model.

This three-dimensional model data includes three-dimensional object represented by the three-dimensional shape of the power pole and three-dimensional coordinate information about the three-dimensional object.

The columnar object detection function unit 26 preliminarily designates the length and aperture of the pole so as to prevent a columnar object other than the power pole from being erroneously detected. The columnar object detection function unit 26 uses the three-dimensional model that falls within the range of each of the designated length and aperture of the column as the power pole for a detection target. The three-dimensional model data on the power pole is delivered to the central axis detection unit 27.

The central axis detection unit 27 connects the central coordinates of the circular model constituting the three-dimensional model data on the power pole with a cubic approximation curve in the longitudinal direction, thereby detecting central axis data in which the central axis is defined as a sequence of coordinate values at the center point for each of predetermined heights of the three-dimensional model for the power pole. When the power pole is a cylindrical object, the central axis detection unit 27 may acquire a sequence of radii for each of predetermined heights of the cylindrical object from the three-dimensional model data.

The deflection vector detection unit 28 detects a deflection vector at the central axis of the three-dimensional model for the power pole based on the three-dimensional model data and the central axis data. This deflection vector includes an inclination of the central axis and the magnitude of a deflection amount of the central axis.

An example of deflection vector detection will now be described. In this example, the deflection vector detection unit 28 connects a lowest point (Z-coordinate=point at the height of 0 meters) of the central axis and a point at the height of 2 meters (Z-coordinate=point at the height of 2 meters) with a straight line, and sets this line as a reference axis.

Figure 3:
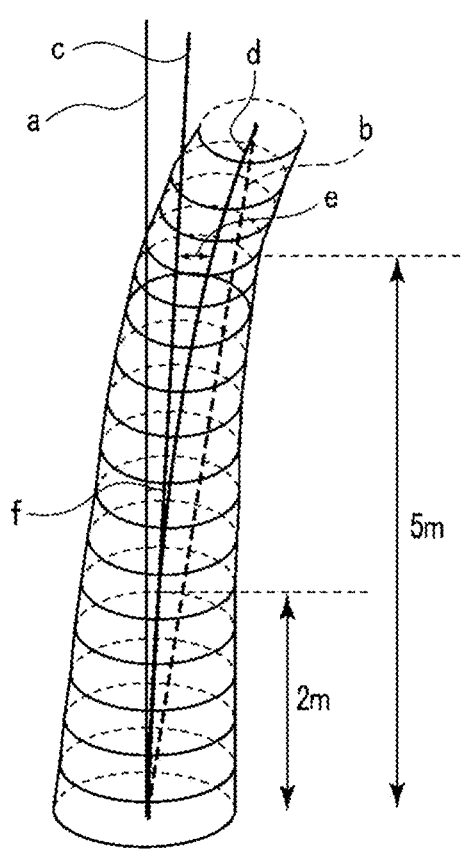
FIG. 3 is a diagram illustrating an example of various definitions related to deflection detection.

FIG. 3 is a diagram illustrating an example of various definitions related to deflection detection.

As illustrated in FIG. 3, a vertical axis ("a" in FIG. 3), an inclined axis ("b" in FIG. 3), a reference axis ("c" in FIG. 3), a central axis ("d" in FIG. 3), deflection ("e" in FIG. 3), and an inclination ("f" in FIG. 3) of the columnar object are defined as follows.

Vertical axis: a vertical line (perpendicular line)

Inclined axis: a straight line connecting central axis coordinates of a sectional circle at the highest position in the columnar object and central axis coordinates of the ground (lowermost surface)

Reference axis: an axis of a line that extends from the ground (lowermost surface of the columnar object) to the height of 2 meters and passes through an area in the vicinity of the center point in the horizontal direction of the columnar object Central axis: an axis connecting the center of each circle (at each height of 4 centimeters)

Deflection: a distance between the reference axis and the central axis at the height of 5 meters from the ground Inclination: an angle formed between the vertical axis and the reference axis The deflection vector detection unit 28 sets, to the three-dimensional model data, a vertical axis and a reference axis, which is a straight line passing through an area in the vicinity of the center point at a height within a range of a predetermined first height of the columnar object, and calculates an angle formed between the vertical axis and the reference axis as the inclination of the central axis of the columnar object.

Further, the deflection vector detection unit 28 detects, as the deflection amount of the central axis of the three-dimensional model data on the columnar object, the distance between the coordinates of the center point corresponding to a predetermined second height of the columnar object indicated by the central axis data and the location at the second height on the reference axis.

As illustrated in FIG. 3, the magnitude and direction of the distance between two points, i.e., the point at the height of 5 meters on the reference axis and the point at the height of 5 meters on the central axis, are detected as the deflection vector. The detected deflection vector, as well as the three-dimensional model data and the central axis data on the power pole, are displayed on the screen of the display device via the result display unit 29.

Further, the result output unit 210 outputs the detected deflection vector is output as a file, as well as the three-dimensional model data and the central axis data on the power pole.

To create the three-dimensional model data from the point group data and to detect the central axis data, known methods as disclosed in, for example, Japanese Patent Laid-Open No. 2017-156179, may be used. To detect the deflection vector, known methods as disclosed in, for example, International Patent Publication No. WO 2019-172065, may be used.

As described above, the facility detection device 13 can extract color information about RGB values held in the acquired point group data, and the detection-target facility from the frequency information, create three-dimensional model data on the columnar facility, and detect the deflection vector for the columnar facility.

Next, the filtering function unit 24 will be described in detail.

Figure 4:
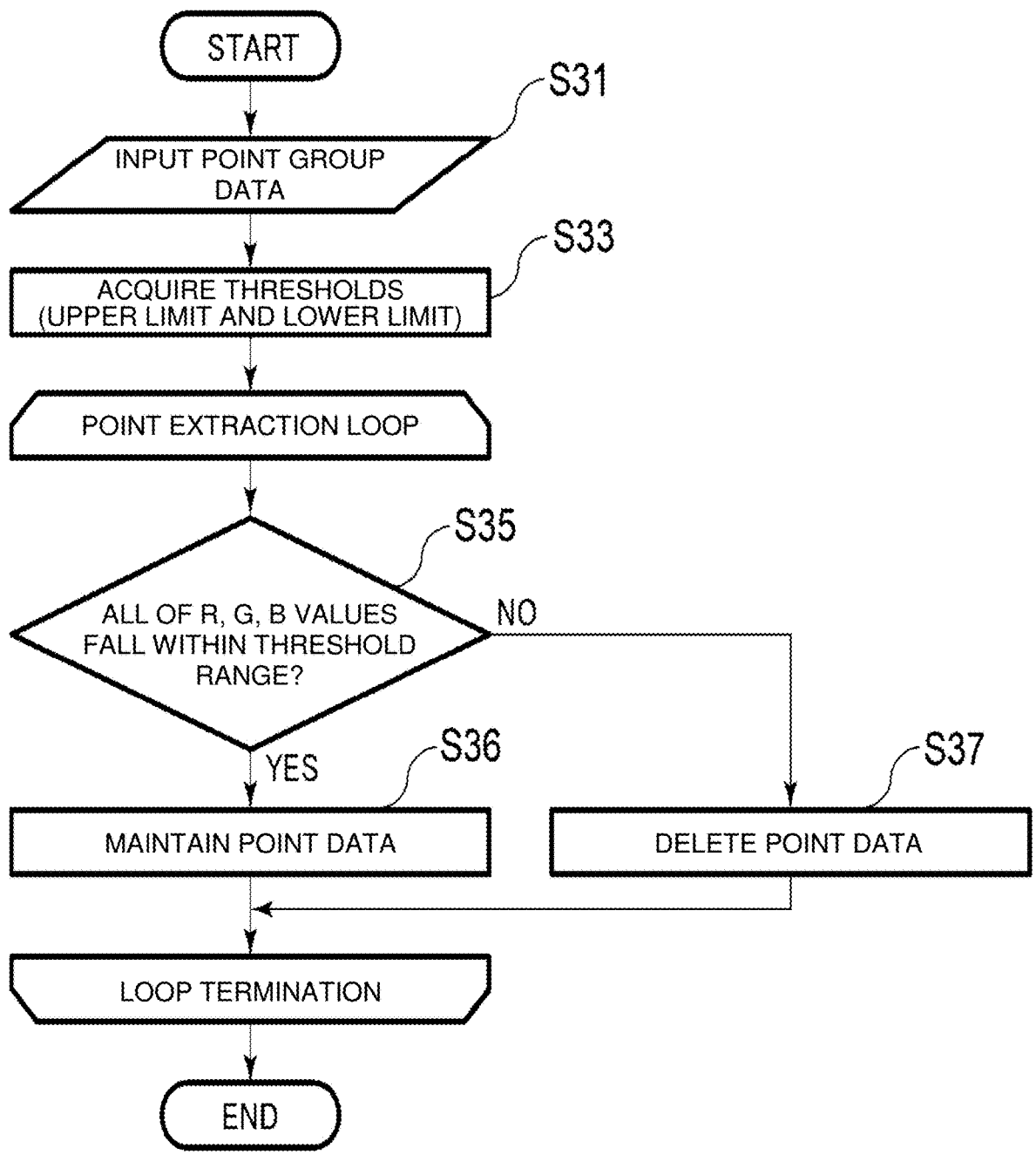
FIG. 4 is a flow chart illustrating an example of a procedure and contents of processing for extracting point group data on a detection-target facility from RGB values.

FIG. 4 is a flow chart illustrating an example of a procedure and contents of processing for extracting point group data on the detection-target facility from RGB values.

When the point group data read by the point group data input unit 23 described above is delivered to the filtering function unit 24, the filtering function unit 24 inputs point group data (S31), and reads three-dimensional coordinates at each point in the point group data and the reflection intensity and RGB values (X, Y, Z, I, R, G, and B). The meaning of each of the X, Y, Z, I, R, G, and B values is as follows.

X: X-coordinate
Y: Y-coordinate
Z: Z-coordinate
I: Reflection intensity
R: Red value
G: Green value
B: Blue value Next, assuming that an upper limit threshold and a lower limit threshold for each of the R-value, the G-value, and the B-value are stored in a predetermined internal memory depending on the target facility 12 for a detection target, the filtering function unit 24 acquires the thresholds (S33) and starts a loop for extracting each point from all the points in the point group data.

Further, the filtering function unit 24 determines whether values corresponding to the respective colors of R, G, and B in the point group data fall within the threshold range (S35). If the values fall within the threshold range (YES in S35), point data in the point group data on the RGB values that fall within the range is maintained (S36).

On the other hand, if it is determined that any one of the values corresponding to the respective colors of R, G, and B in the point group data falls out of each of the thresholds (NO in S35), the filtering function unit 24 deletes the point data in the point group data corresponding to the RGB values that fall outside of the range (S37). In this case, if at least one of the R-value, the G-value, and the B-value falls outside of the threshold range, the filtering function unit 24 can delete the point data including the same coordinates as the coordinates of point data in the point group data on the RGB values that fall outside of the range.

The filtering function unit 24 executes the above-described determination processing on all scores in the point group data. In other words, the processing of S35 to S37 is repeated until the above-described loop is terminated. As described above, the filtering function unit 24 can detect only the target facility corresponding to the designated color.

Figure 5:
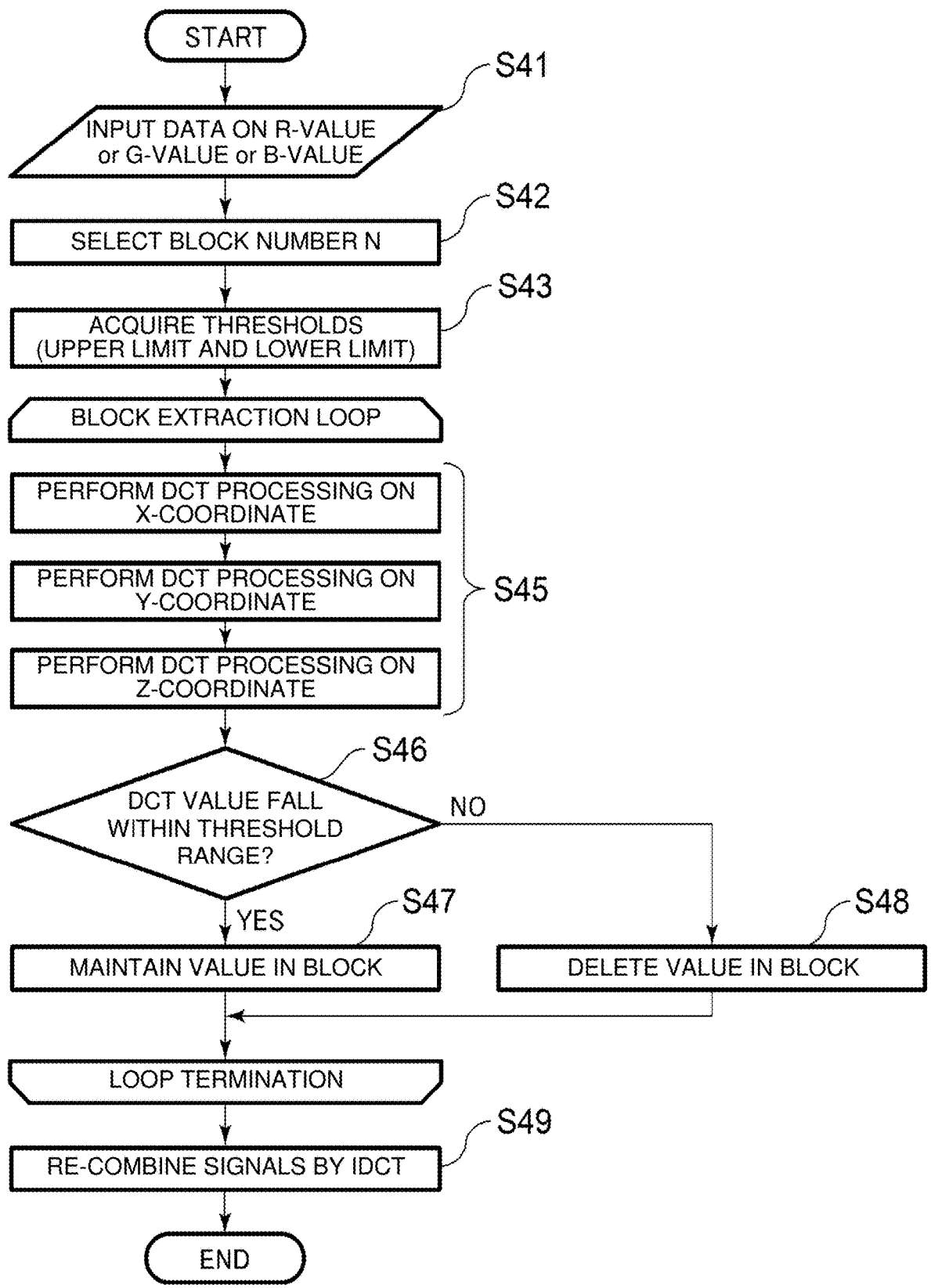
FIG. 5 is a flow chart illustrating a procedure and contents of processing for extracting the point group data on the detection-target facility based on frequency information calculated from RGB values in a three-dimensional space.

FIG. 5 is a flow chart illustrating an example of a procedure and contents of processing for extracting point group data on the detection-target facility based on the frequency information calculated from RGB values in the three-dimensional space.

In the same manner as described above, the point group data read by the point group data input unit 23 is divided into RGB values and is input to the filtering function unit 24 (S41).

Figure 6:
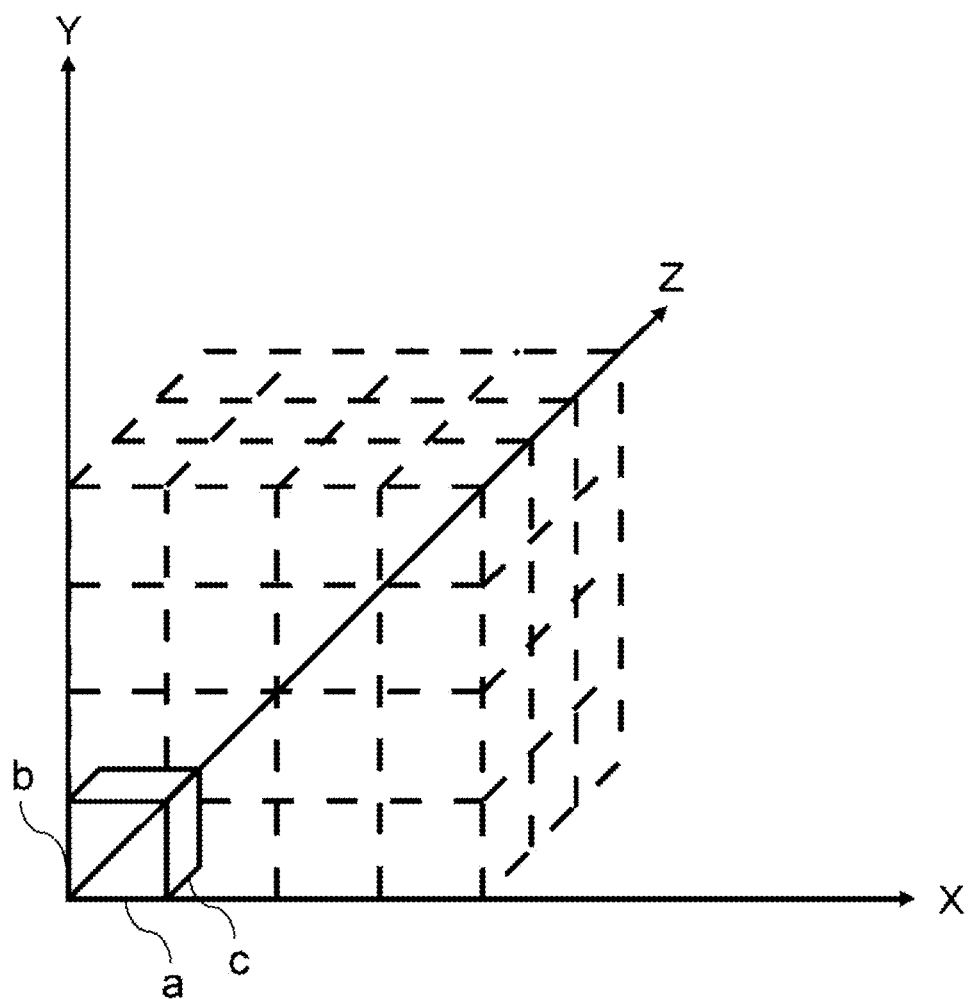
FIG. 6 is a graph illustrating a block for dividing a three-dimensional space.

FIG. 6 is a graph illustrating an example of a block for dividing a three-dimensional space.

As illustrated in FIG. 6, the three-dimensional space in which the point group data, which is input to the filtering function unit 24 and indicates the RGB values, is present includes an X-coordinate, a Y-coordinate, and a Z-coordinate. Assuming that one block is represented by a side "a" along an X-coordinate axis, a side "b" along a Y-coordinate axis, and a side "c" along a Z-coordinate axis, a plurality of blocks are present in the three-dimensional space.

Accordingly, the filtering function unit 24 selects a block number N in the three-dimensional space in which the point group data is present, and divides the three-dimensional space into N blocks depending on the selected block number N (S42).

Next, the filtering function unit 24 acquires a predetermined threshold range as an upper limit and a lower limit for the frequency depending on the detection-target facility 12, and stores the threshold range in the internal memory (S43). This range may be determined by the maintenance worker.

The filtering function unit 24 starts a block extraction loop and performs three-dimensional discrete cosine transform (DCT) processing on the point group data present in the N divided blocks described above.

The DCT processing is processing for converting actual data into actual frequency data and extracting any actual frequency data, which is used as an operation equivalent to filtering.

In this case, the filtering function unit 24 executes one-dimensional DCT processing on each of the RGB values at the X-coordinate, the Y-coordinate, and the Z-coordinate, thereby performing three-dimensional DCT processing (S45).

Assuming that point group data present in one block is represented by P, the data P includes (Xn, Yn, Zn, and Rn) corresponding to a Red value (R-value), (Xn, Yn, Zn, and Gn) corresponding to a Green value (G-value), and (Xn, Yn, Zn, and Bn) corresponding to a Blue value (B-value).

In this case, n represents the number of points in P. The description of an I-value representing the reflection intensity is omitted. The processing of S45 is performed on each of the R-value, the G-value, and the B-value is the same manner. Accordingly, the processing of S45 for the R-value will now be described by way of example. Point group data on the R-value is represented by $P_R$.

Assuming herein that a DCT value obtained by one-dimensional DCT calculation for each X-coordinate in the point group data $P_R$ corresponding to the k-th block is represented by $H_{R,X}(k)$, the DCT value is calculated by the following Expression (1).

[Math. 1]

$$H_{R,X}(k) = \frac{\sqrt{2}}{a} \gamma_k \sum_{n=0}^{a-1} \left( P_R \cos \frac{(2n+1)\pi k}{2a} \right) \quad \text{Expression (1)}$$

where, $\gamma_k = \frac{1}{\sqrt{2}} (k = 0)$, $\gamma_k = 1$ $(k = 1, 2, \ldots, N-1)$ Next, assuming that a DCT value obtained by one-dimensional DCT calculation for each Y-coordinate corresponding to the calculated $H_{R,X}(k)$ is represented by $V_{R,Y}(k)$, the DCT value is calculated by the following Expression (2).

[Math. 2]

$$V_{R,Y}(k) = \frac{\sqrt{2}}{b} \gamma_k \sum_{n=0}^{b-1} \left( H_{R,X} \cos \frac{(2n+1)\pi k}{2b} \right) \quad \text{Expression (2)}$$

where, $y_k = \frac{1}{\sqrt{2}} (k = 0)$, $\gamma_k = 1$ $(k = 1, 2, \ldots, N-1)$ Next, assuming that a DCT value obtained by one-dimensional DCT calculation for each Z-coordinate corresponding to the calculated $V_{R,X}(k)$ is represented by $D_{R,Z}(k)$, the DCT value is calculated by the following Expression (3).

[Math. 3]

$$D_{R,Z}(k) = \frac{\sqrt{2}}{c}\gamma_k \sum_{n=0}^{c-1}\left(V_{R,Y}\cos\frac{(2n+1)\pi k}{2c}\right)$$

Expression (3)

where, $\gamma_k = \frac{1}{\sqrt{2}}$ ($k = 0$), $\gamma_k = 1$ ($k = 1, 2, \ldots, N-1$)

Accordingly, the filtering function unit 24 can acquire the calculated $D_{R,Z}(k)$ as the three-dimensional DCT value of the point group data PR, that is, the actual frequency data of the point group data PR. However, the method for implementing three-dimensional DCT processing is not limited to this example.

The filtering function unit 24 also performs similar three-dimensional DCT processing on point group data $P_G$ and $P_B$ on the G-value and the B-value, and calculates not only the above-described three-dimensional DCT value $D_{R,Z}$, but also a three-dimensional DCT value $D_{G,Z}$ in the point group data $P_G$ and a three-dimensional DCT value $D_{B,Z}$ in the point group data $P_B$.

The filtering function unit 24 determines whether the calculated three-dimensional DCT values $D_{R,Z}$, $D_{G,Z}$, and $D_{B,Z}$ are included in the preliminarily designated frequency threshold range (S46). If the values $D_{R,Z}$, $D_{G,Z}$, and $D_{B,Z}$ fall within the threshold range (YES in S46), the point data in the block is maintained (S47). If any one of the values $D_{R,Z}$, $D_{G,Z}$, and $D_{B,Z}$ fall outside of the threshold range (NO in S46), the point data in the block corresponding to the value that falls outside of the range is deleted (S48).

In this case, if any one of the three-dimensional DCT values $D_{R,Z}$, $D_{G,Z}$, and $D_{B,Z}$ falls outside of the threshold range, the filtering function unit 24 can delete the point data including the same coordinates as the coordinates in the data in the block corresponding to the value that falls outside of the range.

After executing the determination processing on all blocks, that is, after repeating the processing of S45 to S48 until the block extraction loop is terminated, the filtering function unit 24 performs three-dimensional IDCT (Inverse DCT) processing on the three-dimensional DCT value, converts the actual frequency data into original actual data, and then re-combines the signals corresponding to the RGB values, respectively (S49).

In this case, since the same signal re-combining processing is performed on each of the R-value, the G-value, and the B-value, the processing of S49 on the R-value will now be described by way of example. Assuming herein that an IDCT value obtained by one-dimensional inverse DCT calculation for each X-coordinate on the three-dimensional DCT value $D_{R,Z}$ corresponding to the k-th block is represented by $H'_{R,X}(k)$, the IDCT value is calculated by the following Expression (4).

[Math. 4]

$$H'_{R,X}(k) = \frac{\sqrt{2}}{a}\gamma_k \sum_{n=0}^{a-1}\left(D_{R,Z}\cos\frac{(2n+1)\pi k}{2a}\right)$$

Expression (4)

where, $\gamma_k = \frac{1}{\sqrt{2}}$ ($k = 0$), $\gamma_k = 1$ ($k = 1, 2, \ldots, N-1$)

Next, assuming herein that an IDCT value obtained by one-dimensional inverse DCT calculation for each Y-coordinate on an IDCT value $H'_{R,X}(k)$ is represented by $V'_{R,Y}(k)$, the IDCT value is calculated by the following Expression (5).

[Math. 5]

$$V'_{R,Y}(k) = \frac{\sqrt{2}}{b}\gamma_k \sum_{n=0}^{b-1}\left(H'_{R,X}\cos\frac{2n+1)\pi k}{2b}\right)$$

Expression (5)

where, $\gamma_k = \frac{1}{\sqrt{2}}$ ($k = 0$), $\gamma_k = 1$ ($k = 1, 2, \ldots, N-1$)

Next, assuming that an IDCT value obtained by one-dimensional inverse DCT calculation for each Z-coordinate on an IDCT value $V'_{R,X}(k)$ is represented by $P'_R(k)$, the IDCT value is calculated by the following Expression (6). This IDCT value $P'_R(k)$ is the IDCT value filtered with frequency information.

[Math. 6]

$$P'_R(k) = \frac{\sqrt{2}}{c}\gamma_k \sum_{n=0}^{c-1}\left(V'_{R,Y}\cos\frac{(2n+1)\pi k}{2c}\right)$$

Expression (6)

where, $\gamma_k = \frac{1}{\sqrt{2}}$ ($k = 0$), $\gamma_k = 1$ ($k = 1, 2, \ldots, N-1$)

In the three-dimensional IDCT processing, the filtering function unit 24 also performs the above-described three-dimensional IDCT processing on the three-dimensional DCT value $D_{G,Z}$ and $D_{B,Z}$. However, the method for implementing the three-dimensional IDCT processing is not limited to this example.

Specifically, the filtering function unit 24 multiplies the result of the three-dimensional IDCT processing by any coefficient, thereby converting the three-dimensional DCT values $D_{R,Z}$, $D_{G,Z}$, and $D_{B,Z}$ into IDCT values $P'_R$, $P'_G$, and $P'_B$, respectively, which are filtered with frequency information. The filtering function unit 24 combines the IDCT values $P'_R$, $P'_G$, and $P'_B$ to obtain the above-described original three-dimensional coordinates, reflection intensity, and RGB values (X, Y, Z, I, R, G, and B), thereby detecting the target facility in which the designated frequency information is held.

Specifically, the filtering function unit 24 performs three-dimensional DCT processing, thereby converting the RGB values in the block into actual frequency data. Further, the filtering function unit 24 performs filtering of the frequency corresponding to the RGB values for the detection-target facility and the frequency corresponding to the RGB values for an object other than the detection-target facility based on a frequency threshold preliminarily determined depending on the detection-target facility 12. Further, the filtering function unit 24 converts the actual frequency data obtained after filtering into the original RGB values by three-dimensional IDCT processing. Thus, the RGB values corresponding only to the detection-target facility can be extracted.

Filtering performed by the filtering function unit 24 is not limited only to filtering based on RGB values held in the above-described point group data or actual frequency data converted from the RGB values in the three-dimensional space, but instead may be filtering based on the combination thereof.

For example, the filtering function unit 24 may obtain the filtering result based on the combination described above by performing filtering based on RGB values in a certain range depending on the detection-target illustrated in FIG. 3 on the original RGB values obtained by filtering based on the actual frequency data illustrated in FIG. 4.

Further, in a reverse order, the filtering function unit 24 may obtain the filtering result based on the combination of the above-described filtering operations by inputting the RGB values in the certain range depending on the detection-target as illustrated in FIG. 3 and performing filtering based on the actual frequency data as illustrated in FIG. 4.

While the filtering result based on RGB values does not necessarily match the filtering result based on actual frequency data depending on the setting of the above-described thresholds, as described above, after one of filtering based on RGB values and filtering based on actual frequency data is performed, the other filtering is performed so that the both filtering results are reflected, thereby enhancing the accuracy of detecting a structure present in the three-dimensional space.

Further, the filtering function unit 24 may obtain, for the same point group data, the point group data detected by filtering based on the RGB values as illustrated in FIG. 3 and the point group data detected by filtering based on the actual frequency data as illustrated in FIG. 4, and may use the common point group data as the point group data obtained by the combination of the above-described filtering operations.

Figure 7:
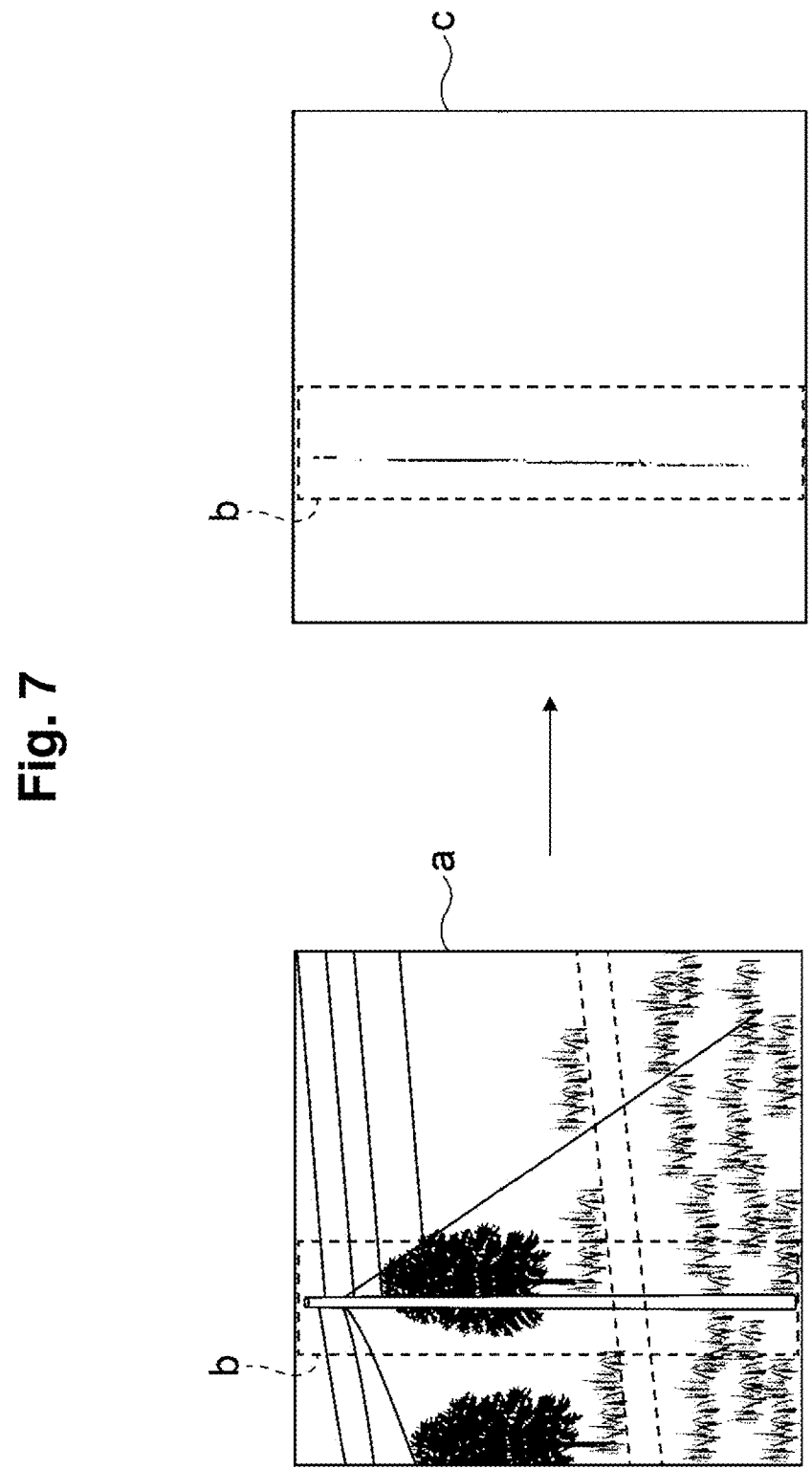
FIG. 7 is a diagram illustrating an example of an image before and after filtering.

FIG. 7 is a diagram illustrating an image before and after filtering.

As an image illustrated in FIG. 7, the detection-target facility, that is, only the power pole surrounded by a dotted line ("b" in FIG. 7) in FIG. 7 in this case, may be output as the detection result ("c" in FIG. 7) in the threshold setting for frequency information and color information in the three-dimensional space ("a" in FIG. 7) in which a color point group is present. Note that the detection-target is not limited to a facility, such as a power pole, but instead may be any object.

Next, advantageous effects of an embodiment of the present invention will be described.

A facility detection device, a facility detection method, and a facility detection processing program according to an embodiment of the present invention have the following superiority over the related art.

First, in the related art, high-density point group data is required to detect a deflection vector for a power pole whose state is to be recognized, and a calculation device having a high processing capability is required to obtain a three-dimensional model for a vast amount of point group data.

On the other hand, according to an embodiment of the present invention, it is possible to extract three-dimensional point group data on only the detection-target facility from a vast amount of three-dimensional point group data, thereby making it possible to reduce the amount of point group data based on which the three-dimensional model is obtained. Therefore, the processing capability required for the calculation device can be lowered.

Second, according to an embodiment of the present invention, it is possible to select three-dimensional point group data according to intended purpose from among various pieces of three-dimensional point group data and to reduce the amount of data to be stored in the storage device.

Figure 8:
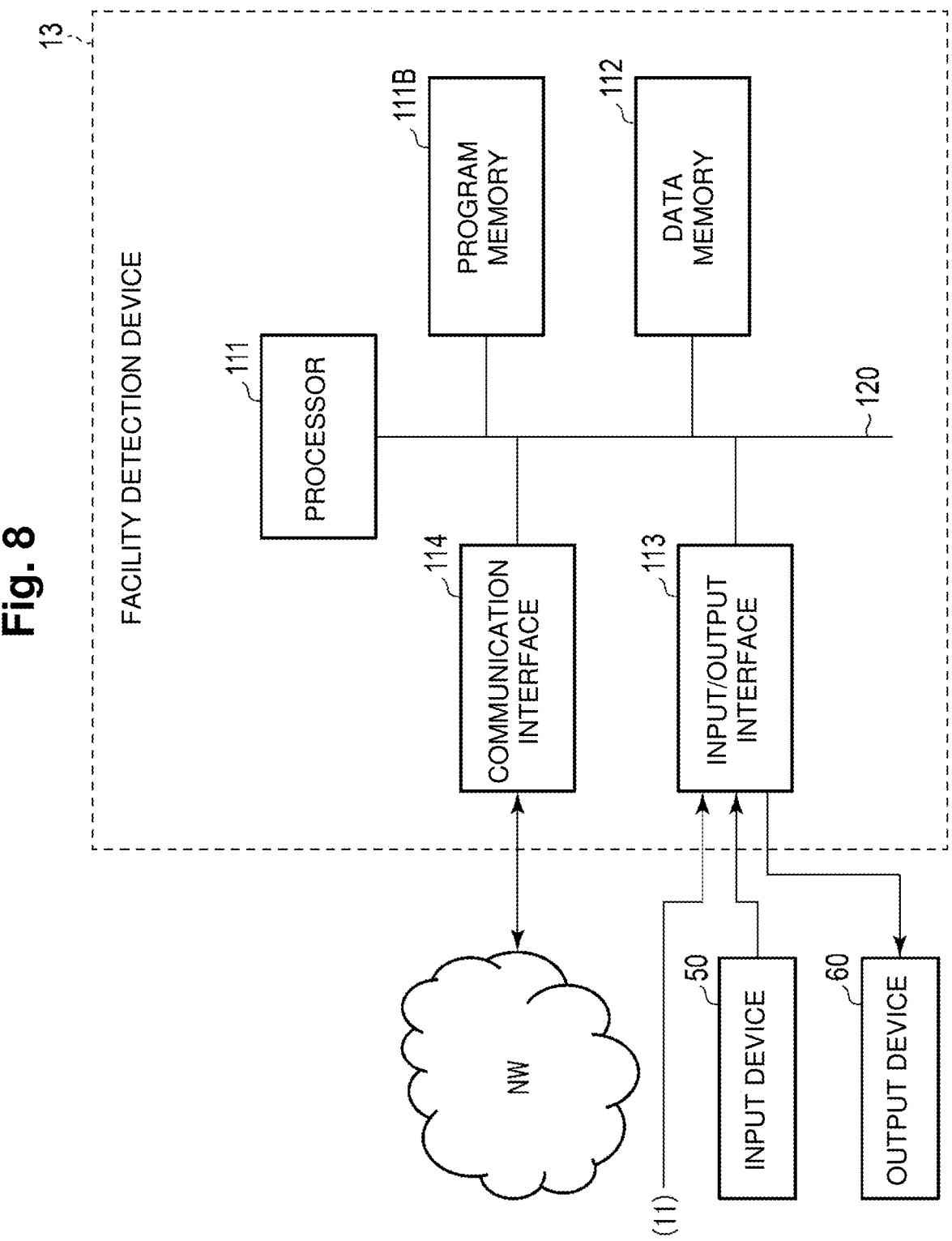
FIG. 8 is a block diagram illustrating an example of a hardware configuration of the facility detection device according to an embodiment of the present invention.

FIG. 8 is a block diagram illustrating an example of a hardware configuration of a facility detection device according to an embodiment of the present invention.

In the example illustrated in FIG. 8, the facility detection device 13 according to the embodiment described above is composed of, for example, a server computer or a personal computer, and includes a hardware processor 111A such as a CPU. A program memory 111B, a data memory 112, an input/output interface 113, and a communication interface 114 are connected to the hardware processor 111A via a bus 120. The same holds true for an AP 20 and an STA 30.

The communication interface 114 includes, for example, one or more wireless communication interface units, and enables transmission and reception of information to and from a communication network NW. As a wireless interface, for example, an interface using low-power wireless data communication standards, such as a wireless LAN, is used.

The input/output interface 113 may be connected with an input device 50 and an output device 60 for the maintenance worker. The input device 50 and the output device 60 may be incorporated in the facility detection device 13.

The program memory 111B is used as a combination of, for example, a non-volatile memory capable of writing and reading data, as needed, such as an HDD (Hard Disk Drive) or an SSD (Solid State Drive), and a volatile memory, such as a ROM (Read Only Memory), as a non-transitory tangible storage medium, and stores programs for executing various control processing according to an embodiment.

The data memory 112 is used as, for example, a combination of the above-described non-volatile memory and the volatile memory, such as a RAM (Random Access Memory), as a tangible storage medium, and is used to store various types of data acquired and created in the process of performing various processing.

The facility detection device 13 according to an embodiment of the present invention can be configured as a data processing device including, as software processing function units, the storage device 21, the point group data input unit 23, the filtering function unit 24, the point group display function unit 25, the columnar object detection function unit 26, the central axis detection unit 27, the deflection vector detection unit 28, the result display unit 29, and the result output unit 210, which are included in the calculation device 22, as illustrated in FIG. 2.

The storage device 21 included in the facility detection device 13 can be configured using the data memory 112 illustrated in FIG. 8. However, a storage area in the data memory 112 is not necessarily provided in the facility detection device 13, but instead may be provided in, for example, an external storage medium, such as a USB (Universal Serial Bus) memory, or a storage device such as a database server disposed in a cloud.

The processing function units in each unit of the above-described facility detection device 13 can be implemented by causing the above-described hardware processor 111A to read and execute programs stored in the program memory 111B. Note that some or all of the processing function units may be implemented by various other forms, including an integrated circuit such as an ASIC (Application Specific Integrated Circuit) or FPGA (Field-Programmable Gate Array).

To attain the above-described object, a first aspect of a structure detection device according to an embodiment of the present invention includes a reading processing unit, a filtering processing unit, and a generation processing unit. The reading processing unit reads, as three-dimensional point group data on an object present in a three-dimensional space, data including three-dimensional position information and color information at a point on a surface of the object. The filtering processing unit performs filtering processing for extracting three-dimensional point group data on a detection-target structure from the three-dimensional point group data on the object present in the three-dimensional space based on the color information. The generation processing unit generates three-dimensional model data in which the detection-target structure is represented as a three-dimensional model based on the three-dimensional point group data on the detection-target structure, the three-dimensional point group data being extracted by the filtering processing unit.

A second aspect of the structure detection device according to the present invention has the following configuration. That is, first, in the first aspect, the filtering processing unit divides the color information into RGB values. Next, the filtering processing unit divides, for each of the RGB values, the three-dimensional space into a plurality of blocks having a certain size. Further, the filtering processing unit calculates, for each of the divided blocks, frequency information about point group data on each of the RGB values, the point group data being present in the blocks. Further, the filtering processing unit extracts, based on the calculated frequency information, a block corresponding to frequency information in a certain range depending on the detection-target structure among the divided blocks for each of the RGB values. Lastly, the filtering processing unit converts the frequency information calculated for the extracted block into original RGB values, and extracts, as three-dimensional point group data on the detection-target structure, three-dimensional point group data including the converted RGB values.

A third aspect of the structure detection device according to the present invention has the following configuration. In the first aspect, the filtering processing unit divides the color information into RGB values, and extracts, as the three-dimensional point group data on the detection-target structure, three-dimensional point group data including RGB values in a certain range depending on the detection-target structure from the three-dimensional point group data on the object present in the three-dimensional space based on the RGB values.

A fourth aspect of the structure detection device according to the present invention has the following configuration. In the first aspect, the filtering processing unit divides the color information into RGB values, divides, for each of the RGB values, the three-dimensional space into a plurality of blocks having a certain size, calculates, for each of the divided blocks, frequency information about point group data on each of the RGB values, the point group data being present in the block, extracts, based on the calculated frequency information, a block corresponding to frequency information in a certain range depending on the detection-target structure among the divided blocks for each of the RGB values, converts the frequency information calculated for the extracted block into original RGB values, and extracts, as three-dimensional point group data on the detection-target structure, three-dimensional point group data including RGB values in a certain range depending on the detection-target structure among the converted RGB values.

A fifth aspect of the structure detection device according to the present invention has the following configuration. In the first aspect, the filtering processing unit divides the color information into RGB values, divides the three-dimensional space into a plurality of blocks having a certain size for each of RGB values in a certain range depending on the detection-target structure among the RGB values, calculates, for each of the divided blocks, frequency information about point group data on each of the RGB values, the point group data being present in the blocks, extracts, based on the calculated frequency information, a block corresponding to frequency information in a certain range depending on the detection-target structure among the divided blocks for each of the RGB values, converts the frequency information calculated for the extracted block into original RGB values, and extracts, as three-dimensional point group data on the detection-target structure, the three-dimensional point group data including the converted RGB values.

A sixth aspect of the structure detection device according to the present invention has the following configuration. In any one of the first to fifth aspects, the detection-target structure is a columnar object, and the structure detection device further includes: a central axis detection processing unit that detects central axis data as a sequence of coordinate values at a center point of the columnar object in a horizontal direction at a plurality of predetermined heights of the columnar object based on the generated three-dimensional model data on the columnar object; and a deflection vector detection processing unit that detects, as a deflection vector for the central axis, an inclination of the central axis of the three-dimensional model for the columnar object and a deflection amount of the central axis based on the three-dimensional model data and the central axis data detected by the central axis detection processing unit.

An aspect of a structure detection method to be performed by a structure detection device according to an embodiment of the present invention includes the steps of: reading, as three-dimensional point group data on an object present in a three-dimensional space, data including three-dimensional position information and color information at a point on a surface of the object; extracting three-dimensional point group data on a detection-target structure from the three-dimensional point group data on the object present in the three-dimensional space based on the color information; and generating three-dimensional model data in which the detection-target structure is represented as a three-dimensional model based on the extracted three-dimensional point group data on the detection-target structure.

An aspect of a structure detection processing program according to an embodiment of the present invention causes a processor to function as each of the units of the structure detection device according to any one of the first to sixth aspects.

In the first aspect of the structure detection device according to an embodiment of the present invention, filtering processing for extracting three-dimensional point group data on a detection-target structure from the three-dimensional point group data on an object present in a three-dimensional space is performed based on three-dimensional position information and color information at a point on a surface of the object present in the three-dimensional space, and generation processing for generating three-dimensional model data in which the detection-target structure is represented as a three-dimensional model is performed based on the three-dimensional point group data on the detection-target structure, the three-dimensional point group data being extracted by the filtering processing unit. Consequently, three-dimensional model data in which a desired structure is represented as a three-dimensional model can be generated.

In the second aspect of the structure detection device according to an embodiment of the present invention, as the filtering processing, frequency information about point group data on each of RGB values present in each of blocks obtained by dividing a three-dimensional space is calculated for each of the divided blocks, a block corresponding to frequency information in a certain range depending on the detection-target structure is extracted for each of the RGB values based on the frequency information, the calculated frequency information is converted into original RGB values for the extracted block, and three-dimensional point group data on the detection-target structure is extracted. Thus, three-dimensional point group data on a desired structure can be extracted using frequency information in a certain range depending on the detection-target structure.

In the third aspect of the structure detection device according to an embodiment of the present invention, as the filtering processing, color information is divided into RGB values, and three-dimensional point group data including RGB values in a certain range depending on the detection-target structure is extracted from the three-dimensional point group data on the object present in the three-dimensional space based on the RGB values. Thus, three-dimensional point group data on a desired structure can be extracted using RGB values in a certain range depending on the detection-target structure.

In the fourth and fifth aspects of the structure detection device according to an embodiment of the present invention, the three-dimensional point group data on the detection-target structure is extracted by a combination of the frequency information in the certain range according to the second aspect and filtering based on the RGB values in the certain range according to the third aspect. This leads to an improvement in the accuracy of detecting a structure present in the three-dimensional space.

In the sixth aspect of the structure detection device according to an embodiment of the present invention, central axis detection processing for detecting central axis data as a sequence of coordinate values at a center point in a horizontal direction of the columnar object at a plurality of predetermined heights of the columnar object is performed, and an inclination of the central axis of the three-dimensional model for the columnar object and a deflection amount of the central axis are detected as a deflection vector for the central axis. Thus, the deflection vector for the columnar object, which is a desired structure, can be detected.

That is, according to the aspects of the present invention, it is possible to detect a structure present in a three-dimensional space while reducing a processing load.

Further, the methods described in the embodiments can be distributed by storing a program (software means) for causing a computer to execute the methods in a recording medium, such as a magnetic disk ((Floppy® disk), hard disk, etc.), an optical disc, (CD-ROM, DVD, MO, etc.), or a semiconductor memory (ROM, RAM, flash memory, etc.), or transmitting the program via a communication medium. Note that the program stored in the medium includes a setting program for configuring software means (including not only an execution program, but also a table and a data structure) for causing a computer to execute the program in the computer. The computer for implementing this device reads a program recorded on a recording medium, or constructs software means using a setting program in some cases, and the software means controls operations to thereby execute the above-described processing. Note that the recording medium described herein is not limited to a recording medium for distribution, but also includes a recording medium, such as a magnetic disk or a semiconductor memory, which is provided in a computer or a device connected via a network.

Note that the present invention is not limited to the above-described embodiments and can be modified in various ways without departing from the gist of the invention in an implementation phase. Further, the embodiments may be carried out by combining the embodiments, as needed, and in this case, combined advantageous effects can be obtained. Furthermore, the above-described embodiments include various inventions, and various inventions can be extracted by combining a plurality of disclosed components. For example, even when some of the components illustrated in the embodiments are omitted, the configuration in which the components are omitted can be extracted as an invention, as long as the problem can be solved by the invention and the advantageous effects of the invention can be obtained.

REFERENCE SIGNS LIST

11 Fixed 3D laser scanner
12 Detection-target facility
13 Facility detection device
21 Storage device
22 Calculation device
23 Point group data input unit
24 Filtering function unit
25 Point group display function unit
26 Columnar object detection function unit
27 Central axis detection unit
28 Vector detection unit
29 Result display unit
210 Result output unit

The invention claimed is:

1. A structure detection device comprising:
a processor; and
a storage medium having computer program instructions stored thereon, when executed by the processor, perform to:
read, as three-dimensional point group data on an object present in a three-dimensional space, data including three-dimensional position information and color information at a point on a surface of the object;
extract three-dimensional point group data on a detection-target structure from the three-dimensional point group data on the object present in the three-dimensional space based on the color information; and
generate three-dimensional model data in which the detection-target structure is represented as a three-dimensional model based on the three-dimensional point group data on the detection-target structure.

2. The structure detection device according to claim 1, wherein the computer program instructions further perform to
divide the color information into RGB values,
divide, for each of the RGB values, the three-dimensional space into a plurality of blocks having a certain size,
calculate, for each of the divided blocks, frequency information about point group data on each of the RGB values, the point group data being present in each of the blocks,
extract, based on the calculated frequency information, a block corresponding to frequency information in a certain range depending on the detection-target structure among the divided blocks for each of the RGB values,
convert the frequency information calculated for the extracted block into original RGB values, and
extract, as three-dimensional point group data on the detection-target structure, three-dimensional point group data including the converted RGB values.

3. The structure detection device according to claim 1, wherein the computer program instructions further perform to
    divide the color information into RGB values, and
    extract, as three-dimensional point group data on the detection-target structure, three-dimensional point group data including RGB values in a certain range depending on the detection-target structure from the three-dimensional point group data on the object present in the three-dimensional space based on the RGB values.

4. The structure detection device according to claim 1, wherein the computer program instructions further perform to
    divide the color information into RGB values,
    divide, for each of the RGB values, the three-dimensional space into a plurality of blocks having a certain size,
    calculate, for each of the divided blocks, frequency information about point group data on each of the RGB values, the point group data being present in each of the blocks,
    extract, based on the calculated frequency information, a block corresponding to frequency information in a certain range depending on the detection-target structure among the divided blocks for each of the RGB values,
    convert the frequency information calculated for the extracted block into original RGB values, and
    extract, as three-dimensional point group data on the detection-target structure, three-dimensional point group data including RGB values in a certain range depending on the detection-target structure among the converted RGB values.

5. The structure detection device according to claim 1, wherein the computer program instructions further perform to
    divide the color information into RGB values,
    divide the three-dimensional space into a plurality of blocks having a certain size for each of RGB values in a certain range depending on the detection-target structure among the RGB values,
    calculate, for each of the divided blocks, frequency information about point group data on each of the RGB values, the point group data being present in each of the blocks,
    extract, based on the calculated frequency information, a block corresponding to frequency information in a certain range depending on the detection-target structure among the divided blocks for each of the RGB values,
    convert the frequency information calculated for the extracted block into original RGB values, and
    extract, as three-dimensional point group data on the detection-target structure, three-dimensional point group data including the converted RGB values.

6. The structure detection device according to claim 1, wherein the detection-target structure is a columnar object, and the computer program instructions further perform to
    detect central axis data as a sequence of coordinate values at a center point of the columnar object in a horizontal direction at a plurality of predetermined heights of the columnar object based on the generated three-dimensional model data on the columnar object; and
    detect, as a deflection vector for the central axis, an inclination of the central axis of the three-dimensional model for the columnar object and a deflection amount of the central axis based on the three-dimensional model data and the central axis data.

7. A structure detection method to be performed by a structure detection device, comprising:
    reading, as three-dimensional point group data on an object present in a three-dimensional space, data including three-dimensional position information and color information at a point on a surface of the object;
    extracting three-dimensional point group data on a detection-target structure from the three-dimensional point group data on the object present in the three-dimensional space based on the color information; and
    generating three-dimensional model data in which the detection-target structure is represented as a three-dimensional model based on the extracted three-dimensional point group data on the detection-target structure.

8. A non-transitory computer-readable medium having computer-executable instructions that, upon execution of the instructions by a processor of a computer, cause the computer to perform the structure detection method according to claim 7.

* * * * *